(12) United States Patent
Bublil et al.

(10) Patent No.: US 7,724,847 B2
(45) Date of Patent: May 25, 2010

(54) TECHNIQUES FOR REDUCTION OF DELAYED REFLECTION INTER-SYMBOL INTERFERENCE

(75) Inventors: Baruch Bublil, Ramat Poleg (IL); Amir Mezer, Haifa (IL)

(73) Assignee: Intel Corporation, Santa Clara, CA (US)

( * ) Notice: Subject to any disclaimer, the term of this patent is extended or adjusted under 35 U.S.C. 154(b) by 975 days.

(21) Appl. No.: 11/121,853

(22) Filed: May 3, 2005

(65) Prior Publication Data

US 2006/0251194 A1 Nov. 9, 2006

(51) Int. Cl.
*H04L 27/06* (2006.01)
*H03D 1/06* (2006.01)

(52) U.S. Cl. ................................ 375/346; 375/341

(58) Field of Classification Search ................ 375/346, 375/316, 340, 341, 343
See application file for complete search history.

(56) References Cited

U.S. PATENT DOCUMENTS

| | | | | |
|---|---|---|---|---|
| 5,881,108 | A * | 3/1999 | Herzberg et al. | 375/296 |
| 6,012,161 | A * | 1/2000 | Ariyavisitakul et al. | 714/795 |
| 7,158,568 | B2 * | 1/2007 | Park et al. | 375/233 |
| 2002/0097818 | A1 * | 7/2002 | Hagenauer et al. | 375/341 |
| 2003/0180055 | A1 * | 9/2003 | Azadet | 398/183 |
| 2004/0001540 | A1 | 1/2004 | Jones | |
| 2006/0181398 | A1 * | 8/2006 | Martich et al. | 340/310.11 |

FOREIGN PATENT DOCUMENTS

EP 1229698 A2 8/2002

OTHER PUBLICATIONS

Gallager, R.G., *Low-Density Parity-Check Codes*, IRE Transactions on Information Theory, vol. 8, Jan. 1962, pp. 21-28.

J.H. Jeong et al., "Turbo Equalizations for Broadband Transmission on Category 6 Cable", IEEE Communications Society, Globecom 2004, pp. 1081-1085.

G. Malhotra et al., "Joint MIMO Equalization and Decoding for 10 GBASE-T Transmission", IEEE Communications Society, Globecom 2004, pp. 918-922.

Notification of Transmittal of the International Search Report and the Written Opinion of the International Searching Authority, or the Declaration, International Application No. PCT/US2006/016710, mailing date Aug. 31, 2006.

* cited by examiner

*Primary Examiner*—Kevin M Burd
(74) *Attorney, Agent, or Firm*—Blakely, Sokoloff, Taylor & Zafman LLP

(57) ABSTRACT

Techniques are described to reduce delayed reflection inter-symbol interference (ISI) in signals. In some implementations, a channel reflection canceller is provided at a signal receiver to reduce delayed reflection ISI in received signals. The channel reflection canceller may be provided with a signal from an equalizer output or a tentative or final decision from a forward-error correction (FEC) decoder. Based on the signal from the equalizer output or tentative or final decisions from the FEC decoder, the channel reflection canceller may generate a signal to reduce delayed reflection ISI in received signals. In addition or as an alternative, in some implementations, the remote transmitter of the signal generates a delayed reflection ISI reducing signal to reduce delayed reflection ISI present in the signal transmitted over a channel. The transmitter may generate the delayed reflection ISI reducing signal using information provided by the remote signal receiver.

27 Claims, 7 Drawing Sheets

TECHNIQUES FOR REDUCTION OF DELAYED REFLECTION INTER-SYMBOL INTERFERENCE

FIELD

The subject matter disclosed herein relates to techniques to reduce delayed reflection inter-symbol interference.

RELATED ART

It is well known that in many communications systems, transmission of signals between a transmitter and a receiver generates inter-symbol interference ("ISI"). ISI may arise from signal passing through a channel, in addition to reflections from impedance mismatching at interface points of a communication medium. Interface points may include connections by a transmitter to the medium as well as connection by a receiver to the medium. Delayed reflection ISI may result from reflection of a signal transmitted from a transmitter through a communications medium to a receiver where such reflection travels across a communication medium several times between transmitter and receiver. For example, delayed reflection ISI may result from a reflection generated from mismatch at the receiver which travels back to the far-end transmitter and is reflected back to the receiver. For example, FIG. 1 depicts an example of a delayed reflection ISI that can occur in response to an impulse transmitted over a mismatched channel. Delayed reflection ISI may corrupt the signal quality of a transmitted signal so that the receiver cannot reproduce the transmitted signal with high integrity or it may degrade system performance, thus resulting in higher requirements of system components.

BRIEF DESCRIPTION OF THE DRAWINGS

Note that use of the same reference numbers in different figures indicates the same or like elements.

DETAILED DESCRIPTION

Reference throughout this specification to "one embodiment" or "an embodiment" means that a particular feature, structure, or characteristic described in connection with the embodiment is included in at least one embodiment of the present invention. Thus, the appearances of the phrase "in one embodiment" or "an embodiment" in various places throughout this specification are not necessarily all referring to the same embodiment. Furthermore, the particular features, structures, or characteristics may be combined in one or more embodiments.

Figure 2:
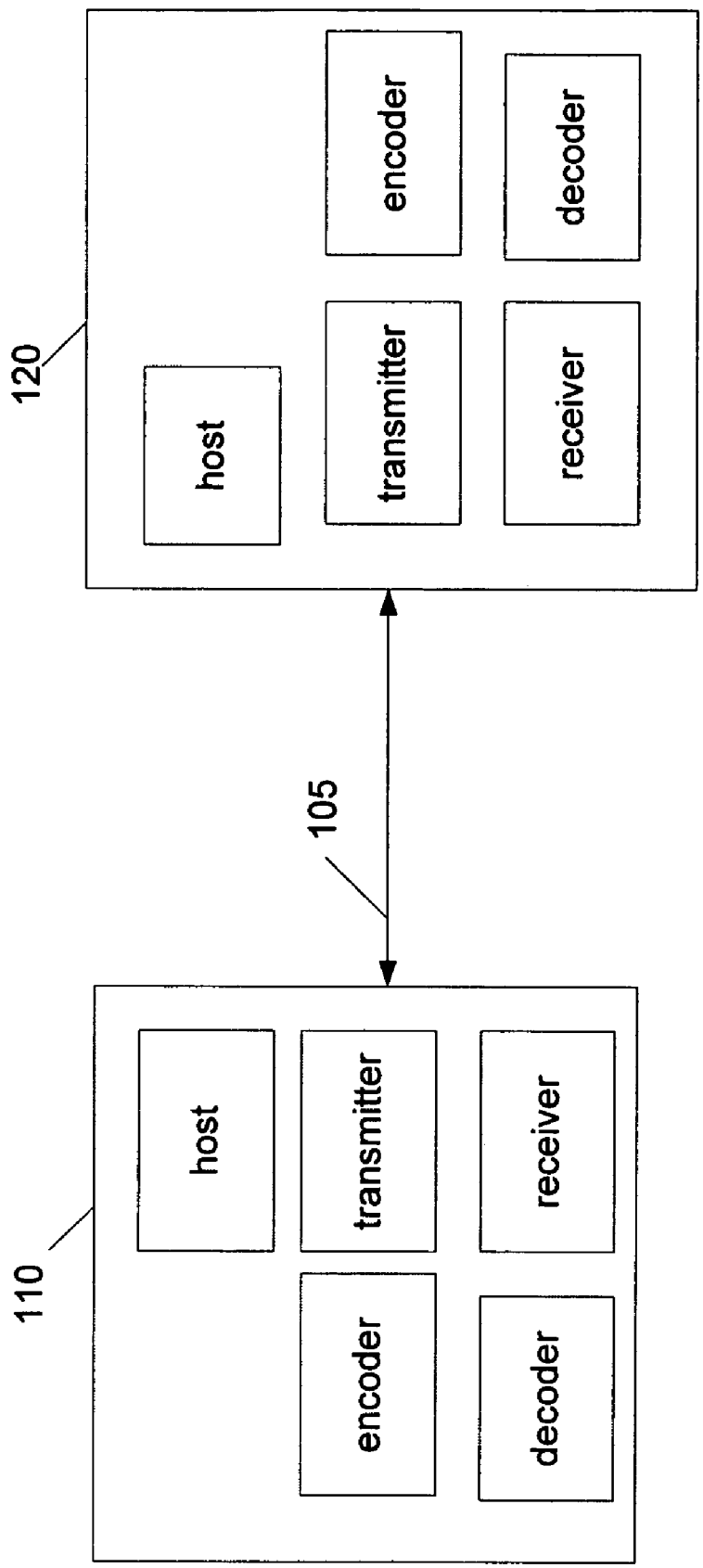
FIG. 2 depicts an example of nodes that are capable of intercommunicating, in accordance with an embodiment of the present invention.

FIG. 2 depicts an example of nodes 110 and 120, in accordance with an embodiment of the present invention. Each of nodes 110 and 120 may include any processing system and/or communications devices. For example, nodes 110 and 120 may be implemented as a pair of switches, a pair of routers, a pair of servers, a switch and a router, a switch and a server, a server and a router, and so forth. Further examples of nodes 110 and 120 may include high-end servers, supercomputers, clusters, grid computing, workgroup switch uplinks, aggregation uplinks, storage systems, and so forth. The embodiments are not limited in this context.

For example, each of nodes 110 and 120 may include a host computing logic, encoder and transmitter pairs, and receiver and decoder pairs. Host computing logic may perform any operations and include any combination of microchips or integrated circuits interconnected using a motherboard, hard-wired logic, software stored by a memory device and executed by a microprocessor, firmware, an application specific integrated circuit (ASIC), and/or a field programmable gate array (FPGA). For example, host computing logic of node 110 may utilize encoder and transmitter pairs and receiver and decoder pairs to communicate with node 120.

For example, encoder and transmitter pairs may prepare signals for transmission using the relevant protocols whereas receiver and decoder pairs may decode signals transmitted in accordance with relevant protocols. For example, the encoder may receive a payload bit stream and provide a coded bit stream encoded in accordance with low-density parity-check codes (LDPC), map the coded bitstream into a modulation scheme such as pulse amplitude modulation symbols with 16 possible values, provide 128 double square (DSQ) symbols, and provide Tomlinson-Harashima preceding on the 128 DSQ symbols. For example, LDPC is described at least in R. G. Gallager, "Low-density parity-check codes," IRE Trans. Inform. Theory, vol. 8, pp. 21-28, January 1962. The transmitter may transmit the encoded symbols. In some embodiments, other forward-error correction (FEC) coding schemes may be used instead of or in addition to LDPC.

In some embodiments, communication between nodes 110 and 120 may be provided using line 105. In some embodiments, line 105 may include copper material and may provide capability of intercommunication between nodes at data transfer rates of at least approximately ten (10) gigabits per second bi-directionally (i.e., transmitting data at 10 gigabits per second while receiving data at 10 gigabits per second), although other transfer rates can be used. For example, each of nodes 110 and 120 may communicate over line 105 in accordance with the evolving 10GBase-T standard as defined by the IEEE 802.3an series of standards, for example, although other standards may be used such as those described in the family of IEEE 802.3. For example, line 105 may include twisted pairs of copper wire. For example, line 105 may be Category 5, 6, 6a, or 7 network cabling and/or any other shielded or unshielded cabling. In some embodiments, communication between nodes 110 and 120 may be provided using a network of any type of medium which is accessible using twisted pairs of copper wire, optic channels, wireless channels, power-line channels, acoustic/sonar channels, printed circuit board (PCB), backplanes, coaxial cable, or any other medium.

Figure 3:
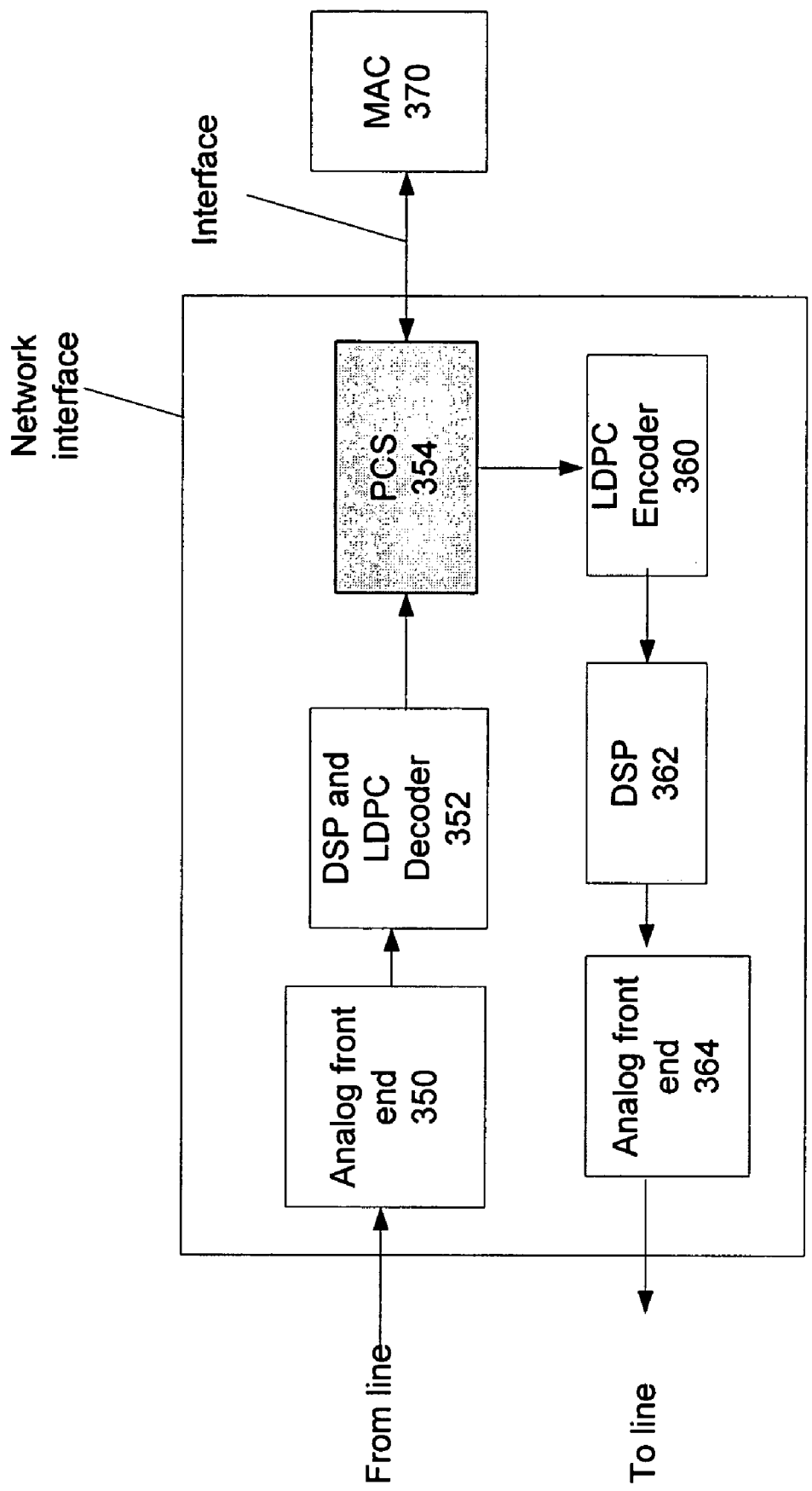
FIG. 3 shows an example implementation of a system in which embodiments of the present invention may be used, in accordance with an embodiment of the present invention.

FIG. 3 shows an example implementation of a transceiver system in which embodiments of the present invention may be used, in accordance with an embodiment of the present invention. For example, a transceiver may include capabilities both to receive and transmit signals. In some embodiments, delayed reflection ISI may be reduced by any or both of (1) transmission of a transmitter delayed reflection ISI reducing signal into the channel where the delayed reflection ISI is induced and/or (2) reducing delayed reflection ISI in a receiver of a signal transmitted in a channel where the delayed reflection ISI is induced. For example, a "channel" may refer to a pair of copper wires or other signal propagation media. For example, the network interface may be used by any of network nodes 110 and 120 in combination with other logic.

For example, with regard to a receiver portion of the network interface, an analog front end 350 may receive signals transmitted over a line such as, but not limited to, line 105. Analog front end 350 may include an analog-to-digital converter and other analog components. Analog front end 350 may provide a digital format signal.

Digital signal processor (DSP) and LDPC decoder 352 may convert signals transmitted for example under the 128 DSQ format into decoded bits at least in accordance with LDPC decoding schemes. In some embodiments, other forward-error correction (FEC) decoding schemes may be used instead or of in addition to LDPC. In some embodiments, digital signal processor (DSP) and decoder 352 may reduce delayed reflection ISI in received signals using techniques described at least with regard to FIGS. 4 and 5, although other techniques may be used. Decoder 352 may provide decoded bits derived from the received signal to Physical Coding Sublayer (PCS) 354.

PCS 354 may at least perform framing, cyclical redundancy checking (CRC), and modulation on the decoded bits as well mapping in accordance with relevant standards. An interface such as Ten Gigabit Media Independent Interface (XGMII) or Ten Gigabit Attachment Unit Interface (XAUI) can be used to communicatively couple PCS 354 and media access control (MAC) 370, although other interfaces may be used.

MAC 370 may at least perform protocol layer processing for example at layers 2 and 3 in the OSI layers model in accordance with relevant standards.

With regard to a transmit portion of the network interface, LDPC encoder 360 may be used to encode information for transmission in accordance with LDPC techniques. In some embodiments, forward-error correction (FEC) coding schemes may be used instead of or in addition to LDPC. For example, LDPC encoder 360 may further perform mapping to pulse amplitude modulation (PAM) symbols (e.g., 16 levels) as well as Tomlinson-Harashima precoding.

Digital signal processor (DSP) 362 may provide a transmitter delayed reflection ISI reducing signal for transmission to a channel that induces delayed reflection ISI. The transmitter delayed reflection ISI reducing signal reduces the delayed reflection ISI present in the channel. DSP 362 may generate the transmitter delayed reflection ISI reducing signal based on a delay and/or shape of the delayed reflection ISI communicated by a receiver. For example, the receiver may determine the delay and/or shape of the delayed reflection ISI using techniques described below described with respect to channel reflection canceller 410 to generate a delayed reflection ISI reducing signal, although other techniques may be used. For example, where multiple channels are used to transmit signals, a transmitter delayed reflection ISI reducing signal may be transmitted into each channel, where the properties of each transmitter delayed reflection ISI reducing signal may be based on the characteristics of the delayed reflection ISI on the channel.

Analog front end 364 may convert digital signals to analog format and perform analog filtering. For example, analog front end 364 may transmit either or both of the signals encoded by LDPC encoder 360 or the transmitter delayed reflection ISI reducing signal to a line for transmission.

Figure 4:
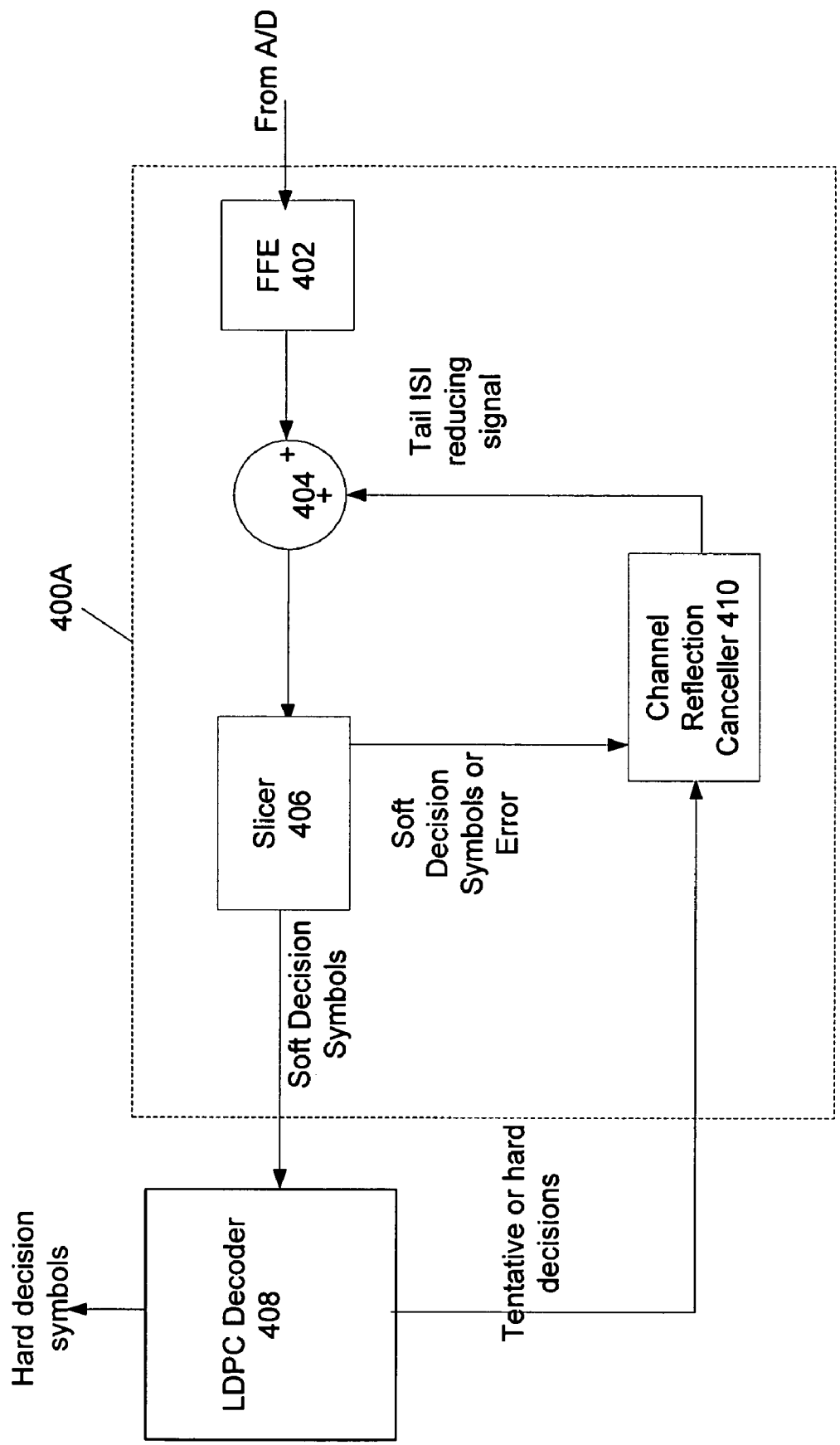
FIGS. 4 and 5 depict examples of decoders, in accordance with embodiments of the present invention.

FIG. 4 depicts an example of a decoder, in accordance with an embodiment of the present invention. For example the decoder may be included in or used by DSP and LDPC decoder 352. The decoder may be capable at least to reduce body and delayed reflection ISI, in accordance with an embodiment of the present invention. One implementation of the decoder may include system 400A and low-density parity-check codes (LDPC) decoder 408. One implementation of system 400A may include Feed Forward Equalizer (FFE) 402, summer 404, slicer 406, and channel reflection canceller 410.

In some embodiments, when 128 DSQ decoding is used to transmit signals, four channels are provided so that system 400A may be replicated as systems 400B-D and LDPC decoder 408 may receive soft decision symbols from each of systems 400A-D, where each replica processes a channel. Based on processing of each of the four channels, LDPC decoder 408 may provide tentative or hard decisions to each of systems 400A-D. Of course, other numbers of channels may be used in other applications.

Feed forward equalizer (FFE) 402 may receive as an input signal a digital format of signals sent from a transmitter. For example, the transmitter may transmit signals in accordance with 10GBase-T as defined by the evolving IEEE 802.3an series of standards, although other standards may be used. For example, the transmitted signal may include payload bits encoded in accordance with LDPC as well as mapped using pulse amplitude modulation (PAM) symbols (e.g., 16 levels), and/or have Tomlinson-Harashima precoding applied.

FFE 402 reduces ISI in input signals. FFE 402 may be implemented as an adaptive finite impulse response (FIR) filter with coefficients adapted to minimize body ISI. For example, FFE 402 may use least mean-square (LMS) or recursive Least-Squares (LS) schemes to adaptively modify the filter tap coefficients to minimize ISI. Other techniques to reduce ISI may be used. FFE 402 provides noisy coded PAM 16 symbols as an output signal.

Summer 404 sums output signals received from FFE 402 with the channel reflection canceller 410 output which includes a delayed reflection ISI reducing signal. The delayed reflection ISI reducing signal from channel reflection canceller 410 provided to summer 404 may reduce delayed reflection ISI present in an output signal provided by FFE 402. Summer 404 may provide a signal having reduced delayed reflection ISI to slicer 406.

Slicer 406 may convert signals from summer 404 into soft decision symbols (e.g., coded PAM 16 symbols with noise). A soft decision symbol may be a high resolution format of a combination of a decision symbol and noise. For example, slicer 406 may provide a soft decision symbol to LDPC decoder 408. Slicer 406 may also transfer the soft decision symbol to channel reflection canceller 410. Some implementations of slicer 406 may include an equalizer.

In some embodiments, when 128 DSQ decoding is used, four channels of PAM 16 soft decision symbols are provided to LDPC decoder 408 by four instances of slicer 406, where each instance processes a channel. LDPC decoder 408 may reduce noise and error in soft decision symbols provided by each instance of slicer 406 after block processing. For example, on soft decision symbols provided by each instance of slicer 406, LDPC decoder 408 may perform parity check nodes processing and bit nodes processing, uncoded bit extraction, and pass extrinsic information between check nodes and bit nodes. For example, LDPC decoder 408 may use any or a combination of the following schemes: Maximum Aposteriori Probability, Bahl Cocke Jelinek & Raviv, Uniformly most powerful, and/or Sum-Product Algorithm. LDPC decoder 408 may output hard decision symbols that may include data as well as other information described in the evolving 802.3an standard. Data as well as other information may be used by applications of a host system or other device such as but not limited to electronic mail or internet browsing.

LDPC decoder 408 may reduce noise and error in soft decision symbols provided by slicer 406 and generate tentative decision symbols. Tentative decision symbols may represent symbols that have less noise and error than in the soft decision symbols received by LDPC decoder 408 from slicer 406 but more noise and error than present in final hard decision symbols. LDPC decoder 408 may operate in an iterative manner and tentative decisions may be generated after a number of iterations which is less than that to generate a corresponding hard decision symbol. LDPC decoder 408 may output tentative or hard decision symbols to channel reflection canceller 410.

In some embodiments, when 128 DSQ decoding is used, four channels of tentative or hard decision symbols are provided by LDPC decoder 408 to four instances of channel reflection canceller 410, where each instance processes a channel. LDPC decoder 408 may transfer tentative or hard decision symbols to one or more instances of channel reflection canceller 410.

In some embodiments, channel reflection canceller 410 may receive tentative or hard decision symbols from LDPC decoder 408. Channel reflection canceller 410 may generate a delayed reflection ISI reducing signal in response to a tentative or hard decision symbol provided by LDPC decoder 408. The delayed reflection ISI reducing signal may be capable to reduce delayed reflection ISI in signals received by summer 404 from FFE 402.

For example, in one embodiment, channel reflection canceller 410 may apply a window with a length of X coefficients to generate a delayed reflection ISI reducing signal in response to delayed tentative or hard symbols. In some embodiments, channel reflection canceller 410 may be implemented as a delay as well as an adaptive FIR having a length of X taps. Each tap has an associated coefficient. Each coefficient may represent one symbol-period of approximately $\frac{1}{800}$ microseconds, although other symbol periods or durations may be used in other applications. The duration of X may be shorter, as long, or longer than the duration of the delayed reflection ISI.

For example, channel reflection canceller 410 may output to summer 404 a delayed reflection ISI reducing signal based on a signal provided by FFE 402 to summer 404 at time t-k whereas the signal provided by FFE 402 to summer 404 in which a delayed reflection ISI may be reduced by the delayed reflection ISI reducing signal may be provided by FFE 402 to summer 404 at time t. For example, the signal provided to summer 404 at time t may be a reflection of the signal provided to summer 404 at time t-k.

During training, channel reflection canceller 410 may determine applied delay as well as filter tap coefficients. For example, the applied delay may indicate a start location (in the time domain) of the window of length X in which delayed reflection ISI is likely to be located. For example, to determine the delay, a search window of length W can be split into N search sections, where X*N=W and X is a length of a search section. For example, to inspect each search section, channel reflection canceller 410 may step through a delay of X*n, where n is the search section number and is incremented between 0 to N-1.

During training, for each of the N search sections (e.g., each incremental delay), based on input of tentative or hard decisions (each of which may include training data) as well as error present in soft decision symbols from slicer 406, channel reflection canceller 410 may adapt coefficients to minimize error provided by slicer 406 using, for example, the LMS algorithm. Training data may include a known sequence and part of an idle symbol sequence from a transmitter and may come from a PCS. For example, the PCS may lock onto the timing of a known sequence transmitter by a remote transmitter.

Figure 1:
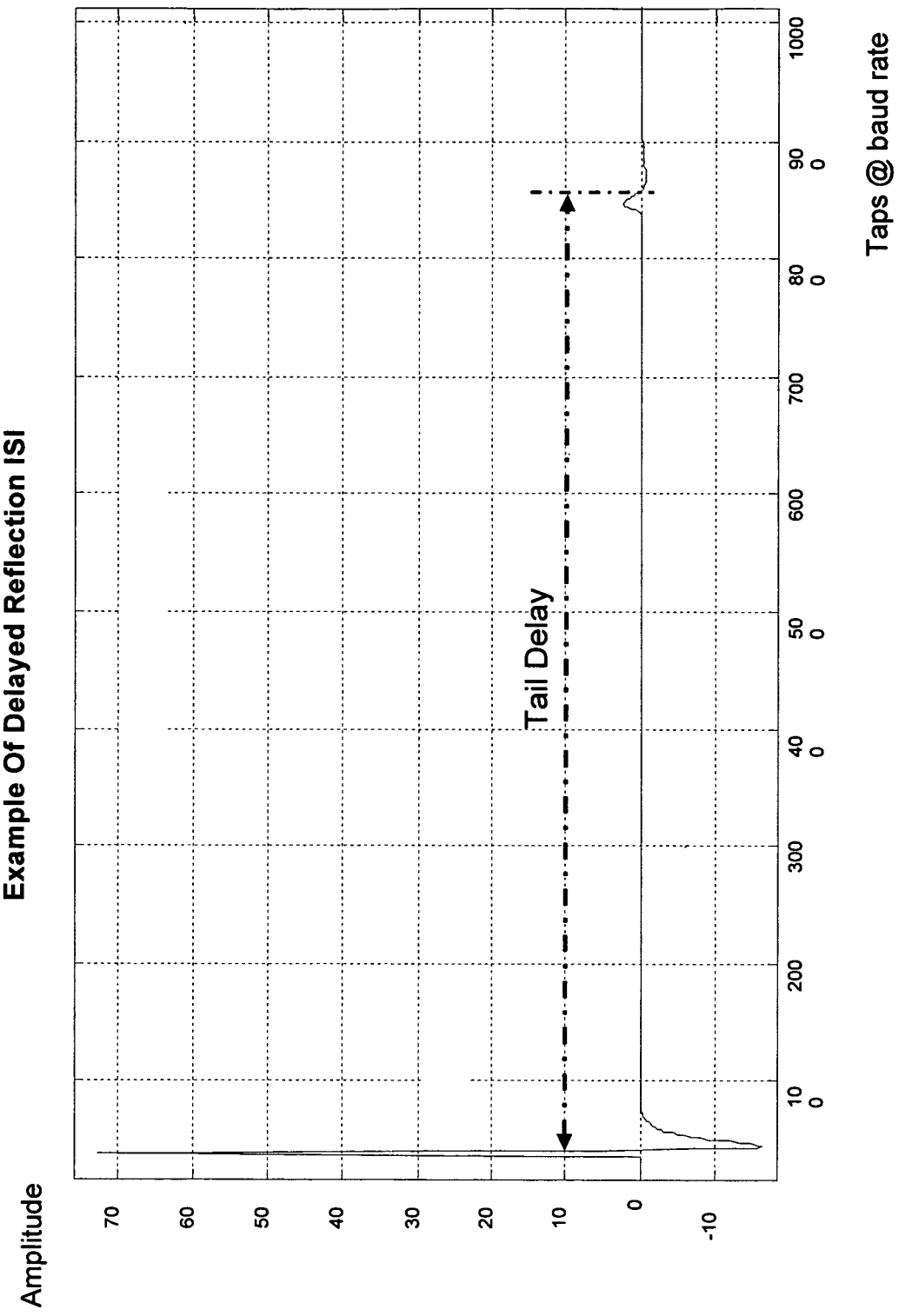
FIG. 1 depicts an example of a delayed reflection inter-symbol interference.

Channel reflection canceller 410 may select the search section corresponding to a highest energy of coefficients or best correlation between hard or tentative decisions from LDPC decoder 408 and delayed slicer outputs. Channel reflection canceller 410 may thereafter apply a delay corresponding to the selected search section. Channel reflection canceller 410 may thereafter apply coefficients determined at the conclusion of processing the selected search section (i.e., coefficients adapted to minimize error provided by slicer 406). This delay may be used to delay tentative or hard decisions, for example, after the training mode. Accordingly, the delay applied by channel reflection canceller 410 may be represented as X*n_opt, where X is in units of time delay of the input to channel reflection canceller 410 and n_opt represents a section number of the selected search section. The determined delay may correspond to a duration of time from a beginning of a signal (i.e., time 0) to approximately a beginning of a delayed reflection ISI. For example, with regard to FIG. 1, the delay may be the time difference between time 0 and the start of the delayed reflection ISI.

After training mode and during idle mode, channel reflection canceller 410 may continue adapting coefficients using, e.g., an LMS algorithm, to minimize error from slicer 406 based on inputs such as training data or idle symbols as well as error from slicer 406. After training mode and during data mode, channel reflection canceller 410 may continue adapting coefficients to minimize error from slicer 406 using, e.g., an LMS algorithm, based on inputs such as error from slicer 406 as well as hard or tentative decisions.

Figure 5:
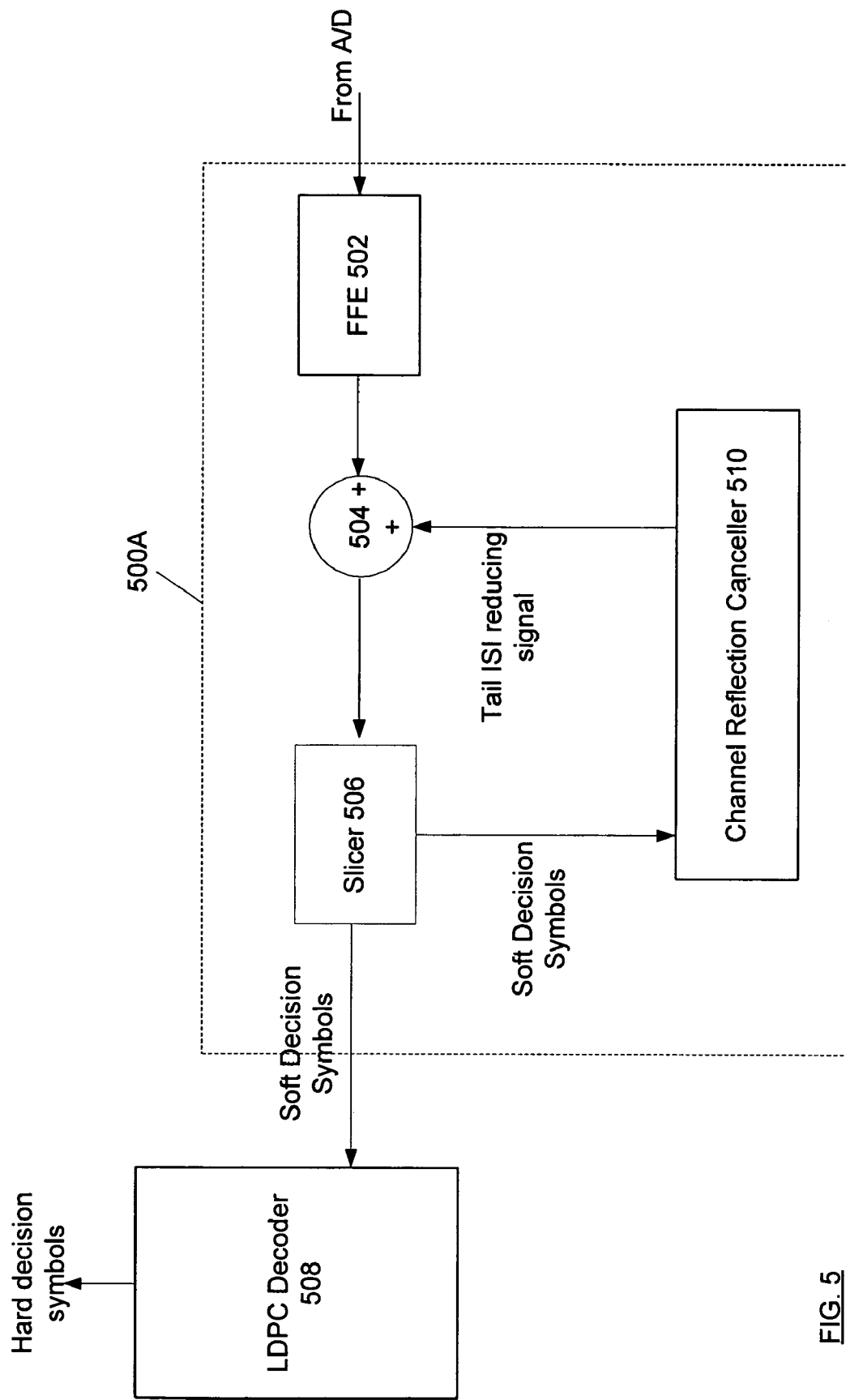

FIG. 5 depicts an example of a decoder, in accordance with an embodiment of the present invention. The decoder may be capable at least to reduce body and delayed reflection ISI, in accordance with an embodiment of the present invention. One implementation of the decoder may include system 500A and LDPC decoder 508. One implementation of system 500A may include Feed Forward Equalizer (FFE) 502, summer 504, slicer 506, and channel reflection canceller 510.

In some embodiments, when 128 DSQ decoding is used, four channels are provided so that system 500A may be replicated as systems 500B-D and LDPC decoder 508 may receive soft decision symbols from systems 500A-D, where each instance of systems 500A-D processes a channel.

FFE 502 and summer 504 may be implemented in a similar manner as respective FFE 402 and summer 404.

Slicer 506 may convert signals from summer 504 into soft decision symbols in a similar manner as that of slicer 406. For example, slicer 506 may provide the soft decision symbols to LDPC 508 as well as to channel reflection canceller 510.

LDPC 508 may provide hard decision symbols based on soft decision symbols from slicer 506. In some embodiments, when 128 DSQ decoding is used, four channels of PAM 16 soft decision symbols are provided to LDPC decoder 508 by four replicas of slicer 506, where each replica processes a channel. LDPC decoder 508 may provide hard decision symbols in a similar manner as that of LDPC 408.

Channel reflection canceller 510 may provide a delayed reflection ISI reducing signal to summer 504 to reduce delayed reflection ISI in signal received by summer 504. Channel reflection canceller 510 may operate in a similar manner as channel reflection canceller 410 to determine delay and coefficients to use to generate a delayed reflection ISI reducing signal except for use of soft decision symbols from slicer 506 instead of use of tentative or hard decision symbols from LDPC decoder 508.

Figure 6:
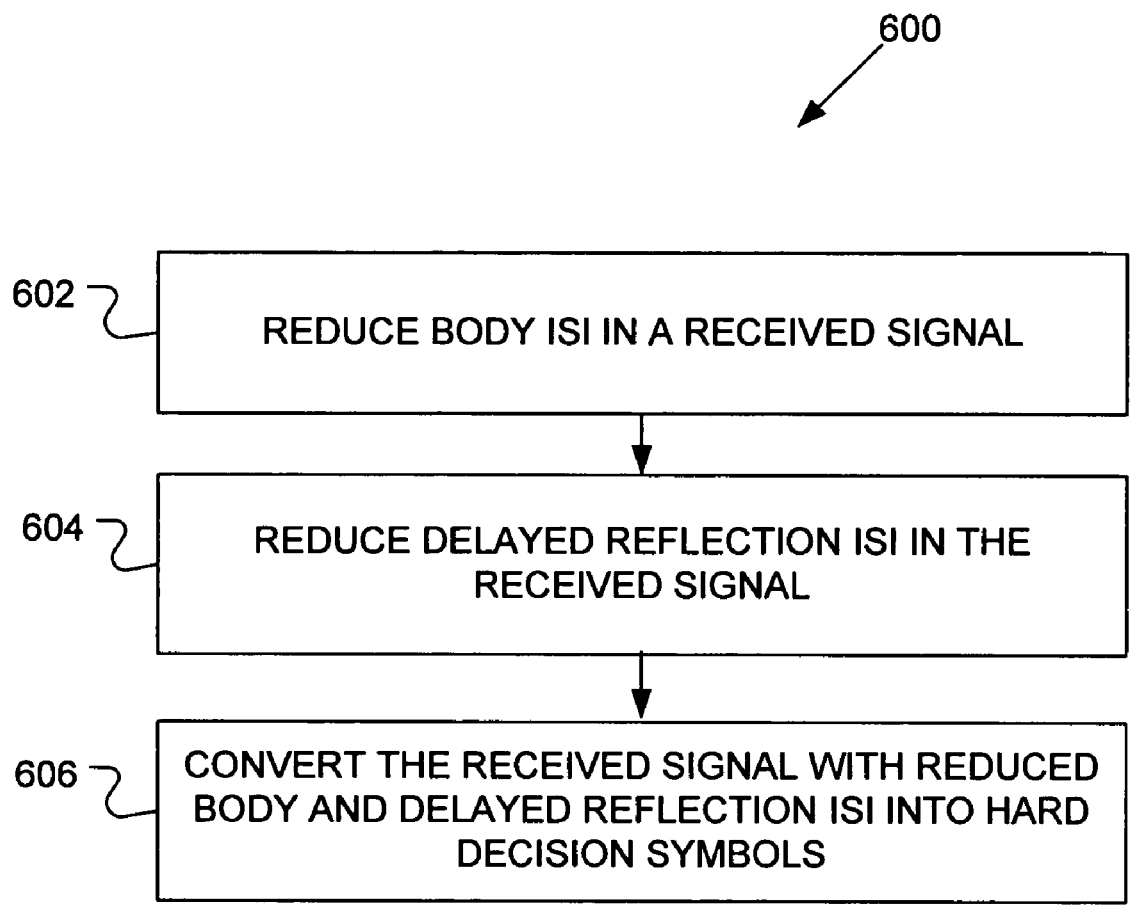
FIGS. 6 and 7 depict example flow diagrams, in accordance with embodiments of the present invention.

FIG. 6 depicts an example flow diagram of process 600 that can be used to reduce body and delayed reflection ISI in a received signal and convert the received signal into a decoded signal, in accordance with an embodiment of the present invention. For example, process 600 may be utilized by the system(s) of FIGS. 4 and/or 5.

In block 602, process 600 may reduce body ISI in a received signal. For example, an adaptive finite impulse response (FIR) filter technique with coefficients adapted to minimize body ISI may be used. For example, a least mean-square (LMS) or recursive LMS schemes may be used to adaptively modify the filter tap coefficients. Block 602 may provide noisy coded PAM 16 symbols, although other formats of signals may be provided.

In block 604, process 600 may reduce delayed reflection ISI in the received signal with body ISI reduced in block 602. For example the delayed reflection ISI may be reduced by application of a delayed reflection ISI reducing signal. The delayed reflection ISI reducing signal may be generated by use of channel reflection canceller that responds to an input signal of a delayed soft, tentative, or hard decision symbols. In instances where soft decision symbols are used to provide a delayed reflection ISI reducing signal, soft decision symbols may be transferred directly from a slicer. In instances where tentative or hard decision symbols are used to provide a delayed reflection ISI reducing signal, an LDPC or other FEC decoder may provide the tentative or hard decision symbols.

In block 606, process 600 may convert the received signal with reduced body and delayed reflection ISI into hard decision symbols. For example, block 606 may include block processing and LDPC and/or FEC decoding of the received signal with reduced body and delayed reflection ISI. Hard decision symbols may include data as well as other information described in the evolving 802.3an standard. Data as well as other information may be used by applications of a host system or other device such as but not limited to electronic mail or internet browsing.

Figure 7:
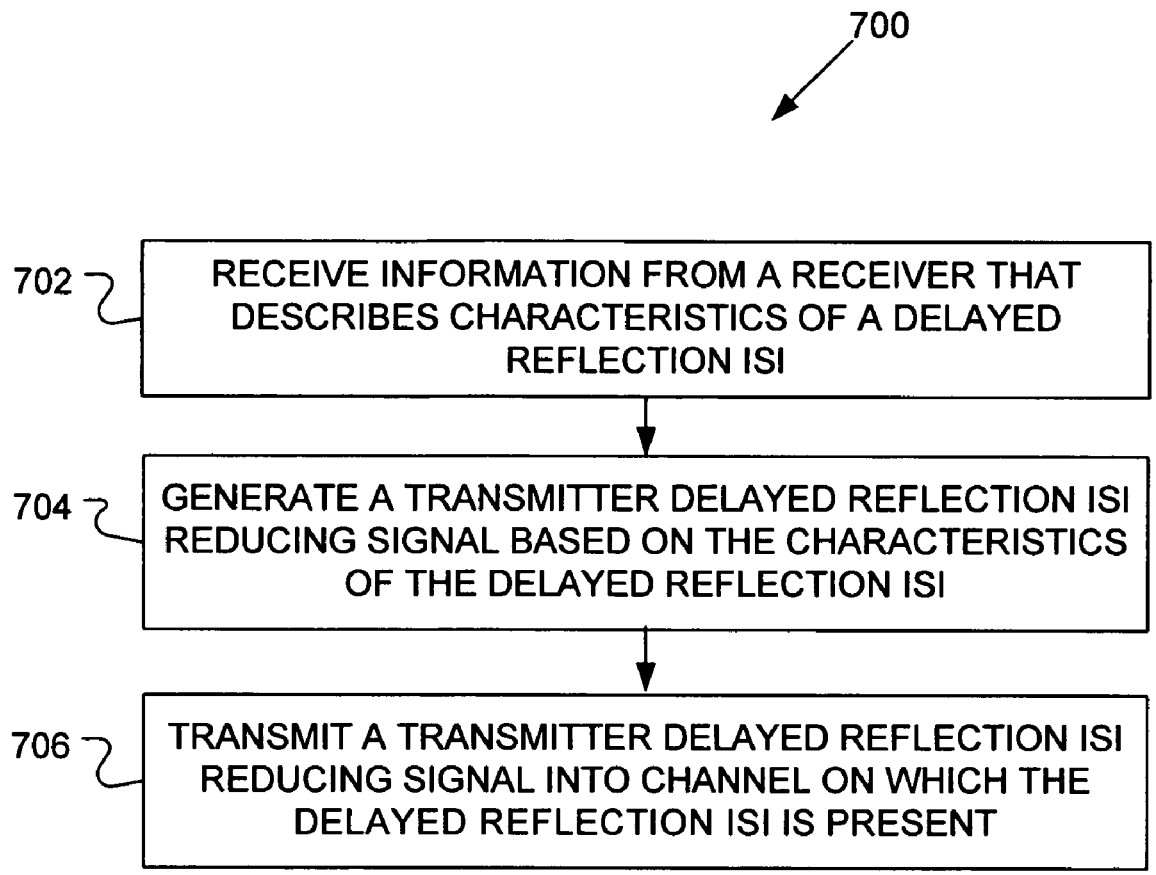

FIG. 7 depicts an example flow diagram of process 700 that can be used to generate transmitter delayed reflection ISI reducing signal, in accordance with an embodiment of the present invention. For example, process 700 may be utilized by the system of FIG. 3 to transmit a signal into a channel that induces delayed reflection ISI in order to reduce delayed reflection ISI.

In block 702, process 700 may receive information from a receiver that describes characteristics of a delayed reflection ISI. For example, the characteristics may include the delay and/or shape of the delayed reflection ISI. The receiver that provides the characteristics may determine the delay and/or shape of the delayed reflection ISI using techniques described earlier with respect to a channel reflection canceller to generate a delayed reflection ISI reducing signal.

In block 704, process 700 may generate a transmitter delayed reflection ISI reducing signal based on the characteristics of a delayed reflection ISI.

In block 706, process 700 may transmit a transmitter delayed reflection ISI reducing signal to the channel in which the delayed reflection ISI is induced for a signal propagated through the channel. The transmitter delayed reflection ISI reducing signal reduces the delayed reflection ISI present on the channel.

Embodiments of the present invention may be implemented as any or a combination of: microchips or integrated circuits interconnected using a motherboard, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

The drawings and the forgoing description gave examples of the present invention. Although depicted as a number of disparate functional items, those skilled in the art will appreciate that one or more of such elements may well be combined into single functional elements. Alternatively, certain elements may be split into multiple functional elements. Elements from one embodiment may be added to another embodiment. For example, orders of processes described herein may be changed and are not limited to the manner described herein. The scope of the present invention, however, is by no means limited by these specific examples. Numerous variations, whether explicitly given in the specification or not, such as differences in structure, dimension, and use of material, are possible. The scope of the invention is at least as broad as given by the following claims.

What is claimed is:

1. A method comprising:
receiving a signal that includes delayed reflection inter-symbol interference (ISI);
reducing delayed reflection ISI in the signal including:
converting a first portion of the signal into a soft decision symbol signal having a pulse amplitude modulation symbol and a noise signal,
performing forward-error correction (FEC) on the soft decision symbol signal to generate a hard decision symbol signal having the pulse amplitude modulation symbol,
providing the hard decision symbol signal to a channel reflection canceller,
providing the soft decision symbol signal to the channel reflection canceller, and
the channel reflection canceller generating a first delayed reflection ISI reducing signal, including:
the channel reflection canceller identifying a best correlation of a section of a time domain window for the hard decision symbol signal to a corresponding section of a time domain window for the soft decision symbol signal; and
the channel reflection canceller determining, based on the identifying, a delay corresponding to the delayed reflection ISI; and
providing data based on the signal having reduced delayed reflection ISI.

2. The method of claim 1, wherein the signal is received via a channel where delayed reflection ISI is induced.

3. The method of claim 1, wherein the reducing delayed reflection ISI further comprises:
combining the first delayed reflection ISI reducing signal with the received signal to reduce delayed reflection ISI in the received signal.

4. The method of claim 1, wherein the reducing delayed reflection ISI comprises:
at a transmitter of the signal, generating the first delayed reflection ISI reducing signal; and
at the transmitter of the signal, transmitting the delayed reflection ISI reducing signal into a channel in which the signal is propagated.

5. The method of claim 4, further comprising:
transferring information describing characteristics of delayed reflection ISI to the transmitter.

6. The method of claim 1, wherein the reducing delayed reflection ISI comprises:
- at a receiver of the signal, generating the first delayed reflection ISI reducing signal;
- at the receiver of the signal, combining the first delayed reflection ISI reducing signal with the signal to reduce delayed reflection ISI in the signal;
- at a transmitter of the signal, generating a second delayed reflection ISI reducing signal; and
- at the transmitter of the signal, transmitting the second delayed reflection ISI reducing signal into a channel in which the signal is propagated.

7. The method of claim 1, wherein the reducing delayed reflection ISI further comprises:
- passing the signal through a slicer, wherein an output of the slicer is directly transferred to the channel reflection canceller.

8. The method of claim 1, wherein the FEC generates the hard decision symbol signal by performing parity check nodes processing and bit nodes processing, uncoded bit extraction, and pass extrinsic information between check nodes and bit nodes on the soft decision symbol signal.

9. The method of claim 1, wherein the providing data includes performing forward-error correction on the signal having reduced delayed reflection ISI.

10. The method of claim 1, wherein the signal comprises a signal transmitted over any of twisted pairs of copper wire, optic channels, wireless channels, power-line channels, acoustic channels, copper line, printed circuit board, backplanes, and coaxial cable.

11. An apparatus comprising:
- logic to receive a signal that includes delayed reflection inter-symbol interference (ISI); and
- logic to reduce delayed reflection ISI in the signal including:
  - a slicer to convert a first portion of the signal into a soft decision symbol signal having a pulse amplitude modulation symbol,
  - a forward-error correction (FEC) decoder to perform FEC on the soft decision symbol signal to generate hard decision symbol signal having the pulse amplitude modulation symbol, and
  - a channel reflection canceller to receive the hard decision symbol signal from the FEC decoder and the soft decision signal from the slicer, the channel reflection canceller further to generate a first delayed reflection ISI reducing signal, wherein the channel reflection canceller to identify a best correlation of a section of a time domain window for the hard decision symbol signal to a corresponding section of a time domain window for the soft decision symbol signal, and wherein the channel reflection canceller to determine, based on the identifying, a delay corresponding to the delayed reflection ISI, and wherein the FEC decoder is further to provide data based on the signal having reduced delayed reflection ISI.

12. The apparatus of claim 11, wherein the slicer comprises at least an equalizer, wherein an output of the slicer is directly transferred to the channel reflection canceller, wherein the channel reflection canceller is to generate the first delayed reflection ISI reducing signal based in part on the output of the slicer.

13. The apparatus of claim 11, wherein logic to reduce the delayed reflection ISI in the signal comprises:
- logic to combine the first delayed reflection ISI reducing signal with the signal.

14. The apparatus of claim 11, wherein the signal comprises a signal transmitted over any of twisted pairs of copper wire, optic channels, wireless channels, power-line channels, acoustic channels, copper line, printed circuit board, backplanes, and coaxial cable.

15. A method comprising:
- receiving at a communication device a signal including delayed reflection inter-symbol interference (ISI);
- at a slicer of the communication device, converting a portion of the received signal into a soft decision symbol signal, the soft decision symbol signal having a pulse amplitude modulation symbol;
- at an FEC decoder of the communication device, performing forward-error correction (FEC) on the soft decision symbol signal, the performing the FEC to generate a hard decision symbol signal having the pulse amplitude modulation symbol, and
- generating information describing the delayed reflection ISI, including:
  - identifying a best correlation of a section of a time domain window for the hard decision symbol signal to a corresponding section of a time domain window for the soft decision symbol signal; and
  - determining, based on the identifying, a delay corresponding to the delayed reflection ISI;
- sending the generated information describing the delayed reflection ISI from the communication device to a second communication device, wherein the second communication device generates a delayed reflection ISI reducing signal based on the information, and wherein the second communication device further transmits the delayed reflection ISI reducing signal into a channel to reduce the delayed reflection ISI in the signal.

16. The method of claim 15, further comprising:
- the communication device providing data based on the signal having delayed reflection ISI reducing by the transmitted delayed reflection ISI reducing signal.

17. The method of claim 15, wherein the information information describing the delayed reflection ISI describes a delay and shape of the delayed reflection ISI.

18. The method of claim 15, wherein the signal comprises a signal transmitted over any of twisted pairs of copper wire, optic channels, wireless channels, power-line channels, acoustic channels, copper line, printed circuit board, backplanes, and coaxial cable.

19. An apparatus comprising:
- a first logic to receive a hard decision symbol signal having the pulse amplitude modulation symbol, the hard decision symbol signal generated by a forward-error correction (FEC) decoder, the first logic further to identify a best correlation of a section of a time domain window for the hard decision symbol signal to a corresponding section of a time domain window for a soft decision symbol signal, the first logic further to determine, based on the identifying, information describing a delay of a delayed reflection inter-symbol interference (ISI), the first logic further to generate a delayed reflection ISI reducing signal based on the determined information; and
- a second logic to transmit the delayed reflection ISI reducing signal into a channel to reduce a delayed reflection ISI.

20. The apparatus of claim 19, wherein the determined information further describes a shape of the delayed reflection ISI.

21. The apparatus of claim 19, wherein the signal comprises a signal transmitted over any of twisted pairs of copper wire, optic channels, wireless channels, power-line channels, acoustic channels, copper line, printed circuit board, backplanes, and coaxial cable.

22. A system comprising:
- a computer comprising a processor, memory, and a bus;
- a network interface communicatively coupled to the bus, the network interface comprising:
  - logic to receive a signal that includes delayed reflection inter-symbol interference (ISI),
  - logic to reduce delayed reflection ISI in the signal including:
    - a slicer to convert a first portion of the signal into a soft decision symbol signal having a pulse amplitude modulation symbol,
    - a forward-error correction (FEC) decoder to perform FEC on the soft decision symbol signal to generate a hard decision symbol signal having the pulse amplitude modulation symbol, and
    - a channel reflection canceller to receive the hard decision symbol signal and the soft decision signal, the channel reflection canceller further to generate a first delayed reflection ISI reducing signal, wherein the channel reflection canceller to identify a best correlation of a section of a time domain window for the hard decision symbol signal to a corresponding section of a time domain window for the soft decision symbol signal, and wherein the channel reflection canceller to determine, based on the identifying, a delay corresponding to the delayed reflection ISI, wherein the FEC decoder is further to provide data based on the signal having reduced delayed reflection ISI.

23. The system of claim 22, wherein the computer comprises one or more of a server, router, or a switch.

24. The system of claim 22, wherein the signal is transmitted in accordance with IEEE 802.3an.

25. The system of claim 22, wherein the signal is transmitted in accordance with IEEE 802.3.

26. The system of claim 22, wherein the logic to reduce delayed reflection ISI in the signal further comprises:
- logic to combine the delayed reflection ISI reducing signal with the signal to reduce delayed reflection ISI in the signal.

27. The system of claim 22, further comprising a transmitter system, wherein the transmitter system comprises:
- logic to transmit the signal into a channel where delayed reflection ISI is induced;
- logic to receive information describing the delayed reflection ISI from the network interface;
- logic to generate a second delayed reflection ISI reducing signal based on the information received from the network interface; and
- logic to transmit a second delayed reflection ISI reducing signal into the channel to reduce delayed reflection ISI in the signal.

* * * * *